Figure 1:
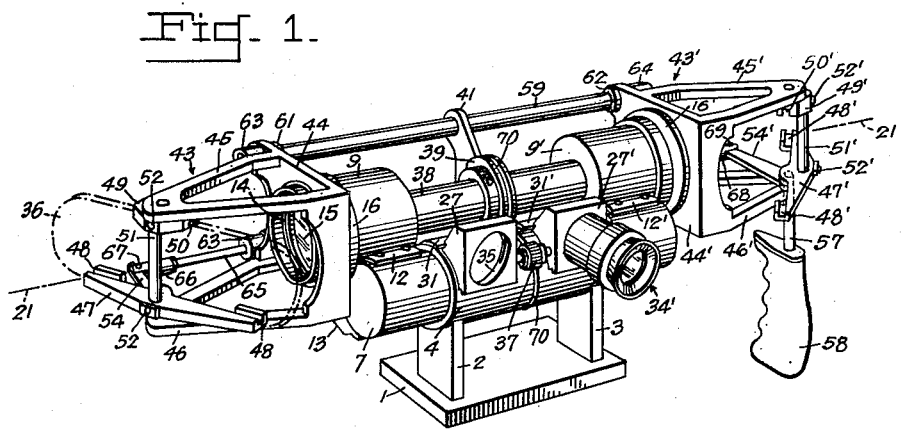

Jan. 20, 1953　　　　　R. HAYWARD　　　　　2,625,854
PANORAMIC BINOCULAR TELESCOPE

Filed Dec. 2, 1947　　　　　　　　　　　　3 Sheets—Sheet 1

Inventor
Roger Hayward

By J. H. Church, W. E. Thibodeau + A. W. Dew
Attorneys

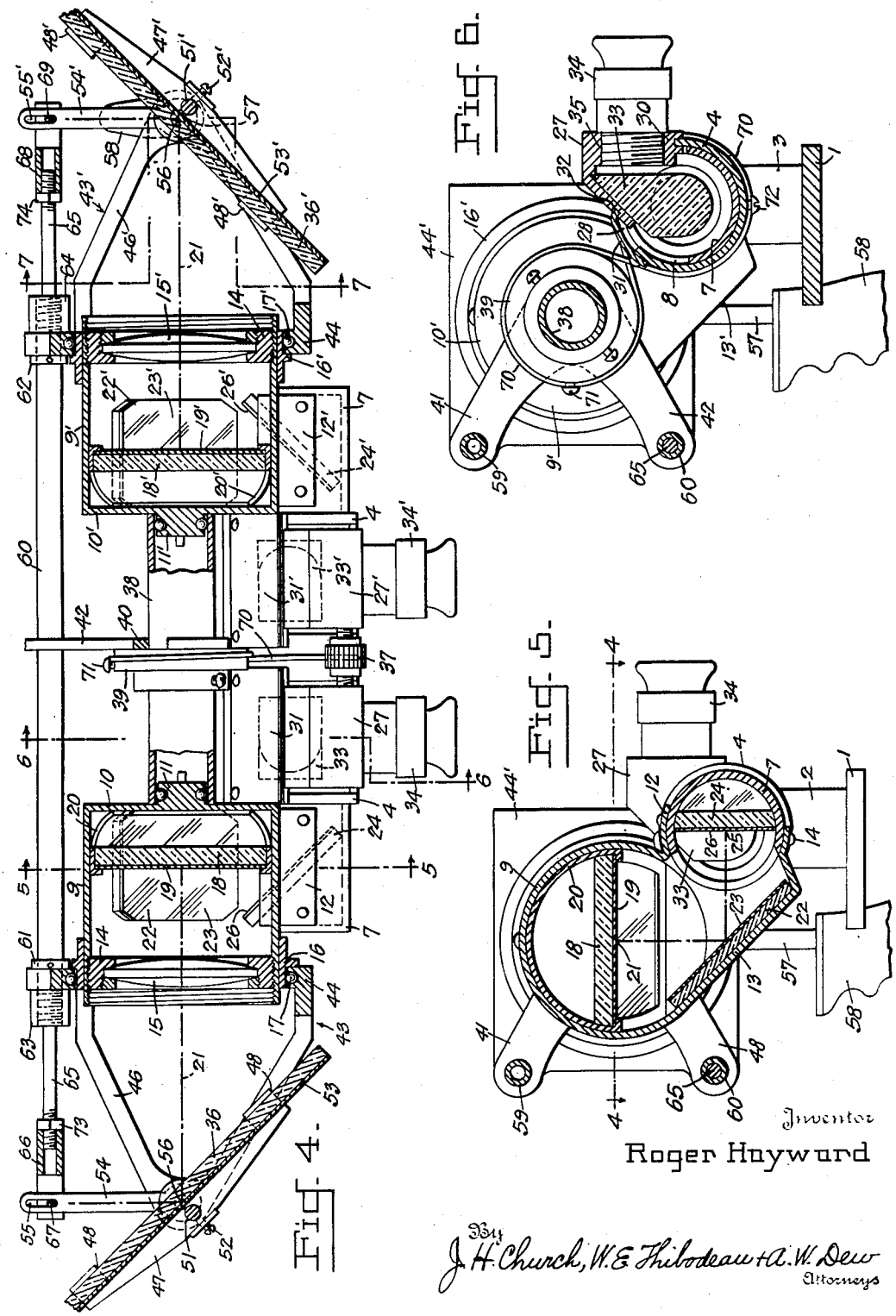

Jan. 20, 1953  R. HAYWARD  2,625,854
PANORAMIC BINOCULAR TELESCOPE
Filed Dec. 2, 1947  3 Sheets-Sheet 3
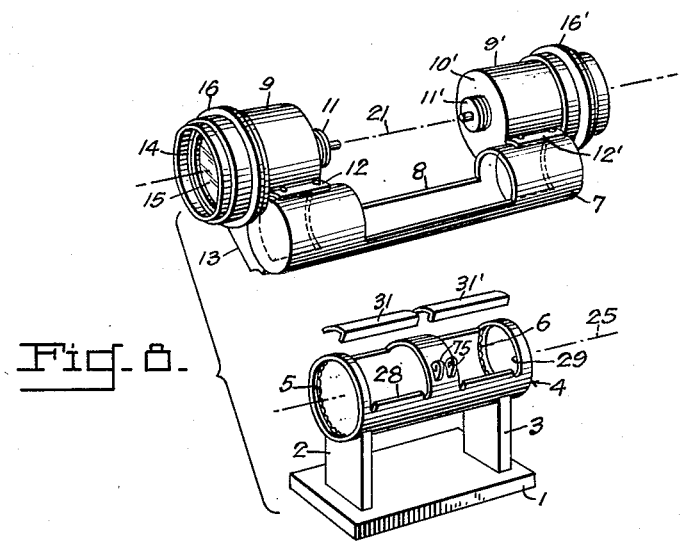
Inventor
Roger Hayward
By
J. H. Church, W. E. Thibodeau + A. W. Dew
Attorneys Patented Jan. 20, 1953

2,625,854

UNITED STATES PATENT OFFICE 2,625,854

PANORAMIC BINOCULAR TELESCOPE

Roger Hayward, Pasadena, Calif., assignor to the United States of America as represented by the Secretary of the Army Application December 2, 1947, Serial No. 789,283

5 Claims. (Cl. 88—32)

This invention relates to optical sighting devices, more particularly to binocular scanning instruments. Such instruments find great utility at observation posts where the observer must be able to inspect a relatively wide area, vertically and horizontally, but, because of other duties or because of a cramped position, has an insufficient range of movement of his head. For example, the gunner of a combat tank, must be able to inspect a relatively wide area, but the armored turret, together with his cramped position within the turret, severely limit his range of vision. As another example of use of such an instrument may be mentioned the pilot or turret gunner of an aircraft. Other uses will readily occur to those skilled in the art.

In binocular vision, the images presented to the two eyes should appear to come from substantially the same direction at all times. Stated in another way, the principal external optical axes of the lines of sight to both eyes, should be relatively fixed in parallelism. If the two lines become angularly related by a small angle in a horizontal plane, the optical accommodation of the normal observer will fuse the two images and enable him to maintain normal stereoscopic vision without difficulty. However, a relative angular motion of the two images in a vertical plane, by as little as two to three minutes of arc will cause stereoscopic vision to be lost. The actual angular movement between the two principal axes, corresponding to the aforesaid two or three minutes of apparent movement, will, for a six-power binocular, for example, be a fraction of a minute. Such a small tolerance requires either that the two reflectors governing vertical deflection be mounted upon one and the same supporting element, or that they be connected by mechanism of the highest precision. Such mechanism is inherently costly to produce.

Hence, it is a principal object of the invention to provide a binocular telescopic scanning instrument which, while relatively simple and inexpensive to construct, inherently operates with a high degree of precision and accuracy.

A second object is the provision of a scanner or binocular of the type aforesaid wherein the reflectors which control vertical scanning are mounted for movement as a unit upon the same mechanical part such that there exists no possibility of relative angular movement between them in normally vertical planes.

A further object is the provision of an optical scanner of the type aforesaid wherein the optical paths between each objective lens and its eyepiece remains constant in length for all angular positions of the lines of sight relatively to the principal axes of the eyepieces.

A still further object is the provision of a scanner wherein both vertical and horizontal movements may be effected by a single control element or handle.

A still further object is the provision of a scanner of the type described which may be constructed as a binocular or monocular type, which is relatively simple and inexpensive to construct, highly accurate in use, and easy to operate.

Figure 2:
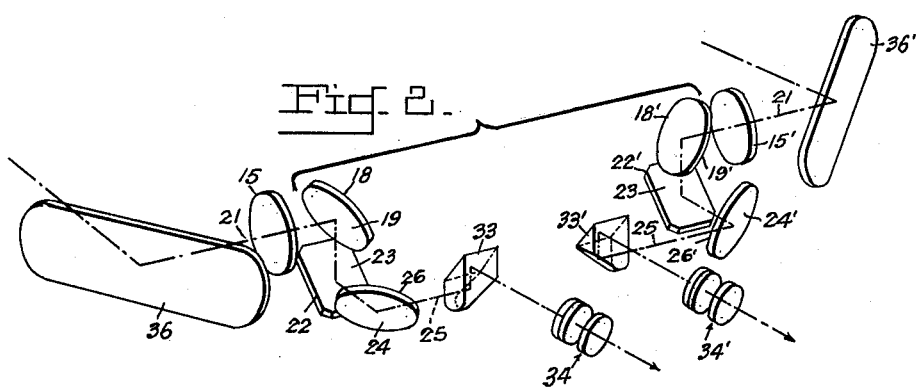
Figure 3:
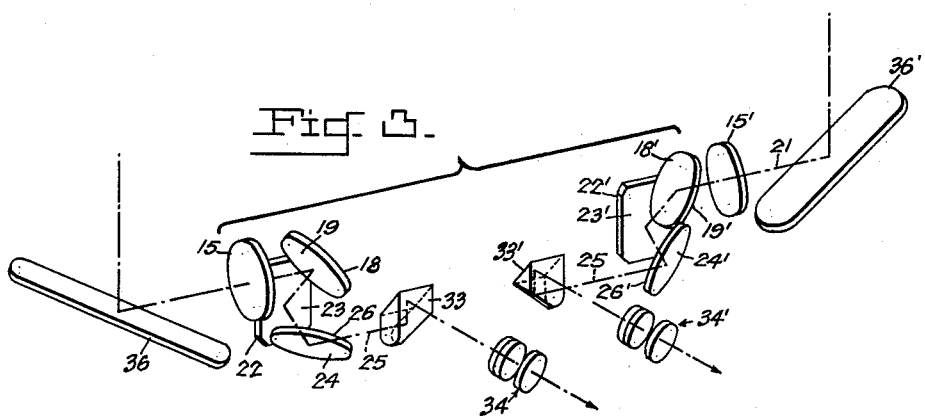

Other objects and advantages will become apparent after a study of the following description:

In the drawing:

Fig. 1 is a perspective view of the invention, the left eyepiece and both entrance reflectors being omitted for greater clarity of illustration, Fig. 2 is a schematic view showing the optical elements in the position they assume when the external line of sight is horizontal, Fig. 3 is a schematic view showing the optical elements in the position they assume when the external line of sight is vertical, Fig. 4 is a sectional view taken in a plane containing the principal axis of the objectives, as indicated by the line 4—4, Fig. 5, Fig. 5 is a sectional view in a plane at right angles to the plane of Fig. 4, as indicated by the line 5—5, Fig. 4, Fig. 6 is a sectional view in a plane parallel to the plane of Fig. 5 as indicated by the line 6—6, Fig. 4, Fig. 7 is a sectional view taken in a plane parallel to the planes of Figs. 5 and 6, as indicated by the line 7—7, Fig. 4, Fig. 8 is an exploded detail view showing the objective support and its pivotal mounting or base, Fig. 9 is an end elevation of the left eyepiece prism, and Fig. 10 is a front elevation of the same prism.

Referring in detail to the drawing, 1 identifies a base having parallel spaced uprights 2 and 3 rigid therewith, and supporting a bearing tube 4 at their upper ends. Tube 4 has anti-friction bearings 5 and 6 fitting within its ends. A sleeve 7 has a semi-cylindrical mid-portion cut away, as indicated at 8, Fig. 8. This sleeve, in the assembled instrument, fits within and is journaled by bearings 5 and 6 adjacent the ends of cutout 8.

Left objective and reflector holder 9 is generally cylindrical in form and has its inner end closed at 10, Fig. 4. This end carries a centrally-positioned inner bearing race 11 for a purpose subsequently described. The holder 9 is rigidly attached to the corresponding, or left end of sleeve 7, as by means of an integral outwardly-turned flange 12, Figs. 4, 5 and 8, conveniently riveted to the upper side of sleeve 7, and an integral tangential wall or flange 13 extending tangentially downwardly from the lower forward side of the holder and secured to the lower side of sleeve 7, as by riveting at 14, Fig. 5. The outer end of holder 9 is closed by an objective assembly, including ring 14 threaded therein and carrying objective 15. An inner race 16 of an anti-friction bearing 17 extends about and is secured to the outside of the outer end of holder 9.

In addition to objective lens 15, holder 9 supports a first erector mirror 18 having its reflecting surface 19 on its forward side. This mirror is mounted by a frame 20 fitting within and secured to the holder, and extends at 45° across the principal axis 21 of the objective 15. Holder 9 also carries a second erecting mirror 22 secured to the aforesaid tangential wall 13 and having its reflecting surface 23 upon its front surface. As will be noted from Figs. 2, 3, 4 and 5, reflectors 18 and 22 are co-extensive in planes normal to axis 21 so that rays received by 19 from objective 15 are reflected to 22 in a direction radial of axis 21. Mirror 22 is parallel to axis 21, as will be obvious from inspection of Fig. 5.

A third erecting mirror 24 is mounted within the left-hand portion of sleeve 7 at 45° across the axis 25 and in rotational position to receive the rays reflected from mirror 22, and to reflect the same parallel with and inwardly along axis 25. Axes 21 and 25 are parallel. Like reflectors 18 and 22, reflector 24 has its reflecting surface 26 on its forward face. All three mirrors are fixedly related and move as a unit when sleeve 7 is rotated in bearings 5 and 6.

From Fig. 8, it will be noted that bearing tube 4 has two substantially semi-cylindrical cut-outs 28 and 29 having two boundary edges along common elements of the cylinder. Carrier 27 (Figs. 1 and 6) is formed with a groove 30 which receives the lower edge of cut-out 28 and assists in guiding the carrier for axial movement. A gib 31 is attached, as by screws, to the opposite edge of cut-out 28. The free edge of this gib is bent to project with a smooth fit, into a channel 32 formed in the upper portion of carrier 27. Thus the carrier is prevented from rotation about axis 25 but is free for limited sliding in a direction parallel with such axis.

The prism 33 is fixed within carrier 27 and is a modified form of double right-angle prism effective to erect the image received from reflector 24. The eyepiece 34 may be of any conventional well-known type and is assembled as a unit and screwed into an opening 35 in carrier 27.

The foregoing optical elements, including the entrance reflector 36, whose mounting will be subsequently described, constitute the left optical train. As will be noted from Figs. 2 and 3 in particular the right optical system is, in general, a mirror duplicate of the left system just described so that it is deemed unnecessary to describe the same in detail. Each part of the right optical train has been given the same reference character, primed, as has been used to identify the corresponding part in the left train. Thus it is deemed sufficient, referring more particularly to Figs. 2 and 3, to mention right entrance reflector 36', objective 15', erecting reflectors 19', 22' and 24', prism 33' and eyepiece 34'. Except for prism 33', each optical part of the right train may be a duplicate of the corresponding part of the left train. Prism 33' is a mirror duplicate of prism 33 as will be obvious from inspection.

Right eye-piece 34' is supported by a carrier 27' which is mounted within cut-out 29 of tube 4 for limited movement along axis 25 in the same manner as has been described for carrier 27. A thumbscrew 37, having right- and left-hand threads at its respective ends, is journaled in lugs 75 secured to tube 4. The threaded ends of screw 37 engage correspondingly threaded holes in carriers 27 and 27' so that, when turned, the screw acts to vary the spacing of the eye-pieces to suit the interpupillary dimension of the observer. Focussing may be effected in a conventional manner, by turning the eyepieces.

The right objective 15' and reflector 18' are mounted in a holder 9' in the manner previously described for objective 15 and reflector 18, reflector 18' being supported in a frame 20'. Holder 9', is a mirror duplicate of holder 9, and is rigidly attached to the right end of sleeve 7 by flanges or walls 12' and 13', Figs. 1 and 6, corresponding to flanges 12 and 13, previously described. This holder also carries on its external surface an inner race 16' of an anti-friction bearing, substantially coplanar with objective assembly 15'.

The inner end of holder 9' is closed by a wall 10' which, like wall 10, carries a central bearing race 11'. The two races 11 and 11' are coaxial with axis 21 and between them, rotatably support a hollow shaft 38 on which is centrally fixed, a pulley 39 having a predetermined effective belt diameter. A bracket 40, Fig. 4, having integral, angularly-related, forwardly-extending arms 41 and 42, is also rigidly attached, either to pulley 39, or to shaft 38.

Bracket 40 forms one element of a unitary frame by which entrance reflectors 36 and 36' are mounted for universal synchronous motion. This frame includes a bracket 43 which comprises a plate 44, Figs. 1 and 4, having a central opening journaled on race 16 and, in fact, forming the outer race of bearing 17, and spaced standards 45 and 46. These standards have aligned openings at their outer ends, which define the transverse or laterally-extending pivot axis for entrance mirror 36.

As clearly shown upon Fig. 1, mirror 36 is carried by and between a lower member 47 having its ends formed with upwardly-facing, aligned channels such as 48, and an upper member 49 having a channel 50 downwardly facing as seen in Fig. 1. Members 47 and 49 are united by a rod 51 to which they may be rigidly fixed, as by set screws 52, Fig. 4. Each of the members has a stud projecting therefrom in offset relation with rod 51 and adapted to have a bearing fit in the aligned apertures in standards 45 and 46.

The aforesaid channels in members 47 and 49 receive and grip the opposite edges of reflector or mirror 36. From Fig. 4 it will be noted that this mirror has its reflecting surface 53 on its rear face and that the transverse pivot axis 56 of the mirror assembly, as defined by the aforementioned studs, lies in the plane of said reflecting surface. A lever 54 having a slot 55 in its outer end extending radially of axis 56, is attached to, or integral with, member 47.

The right entrance mirror 36' is mounted in the same manner as that just described for mirror 36 and the parts of this mounting have been given the same reference numerals, primed, as have been used to identify corresponding parts of the mounting for mirror 36. Consequently, it will be sufficient to identify bracket 43' comprising plate 44' and standards 45' and 46', lower mirror-mounting member 47', upper mounting member 49', and lever 54' with its slot 55'. In addition, the stud projecting from member 47, is, in the case of member 47', replaced by a downwardly extending rod 57, to the lower end of which a control handle 58 is affixed and by which the direction of the line of sight in elevation and azimuth may be controlled in the manner subsequently explained. The mirrors 36 and 36' have been omitted in Fig. 1 for greater clarity of illustration.

Plates 44 and 44', at the upper and lower corners of their forward edges, are provided with apertured lugs. The apertures at the upper corners are in axial alignment with that in the end of arm 41, while those at the lower corner are in axial alignment with the aperture in the end of arm 42. The three brackets 43, 40 and 43', are connected for movement as a unit, by tubes 59 and 60. As seen at Fig. 4, tube 60 has threaded ends and collars 61 and 62 fixed adjacent its respective ends. The tube passes through the aligned apertures in brackets 43, 40 and 43' and brackets 43 and 43' are rigidly fixed in spaced relation by nuts 63 and 64 threaded onto the ends of tube 60, and acting to clamp a respective bracket against its collar. Tube 59 is preferably identical with tube 60 and is secured to brackets 43 and 43' in the same manner. Each tube passes with a snug fit through the aperture in a respective arm 41 and 42. If desired, these arms may be fixed to the tubes as by soldering or set screws. In the claims, the unitary structure including brackets 40, 43, 43' and tubes 59 and 60, will be termed a frame.

A rod 65 has a smooth sliding fit within tube 60. This rod is threaded at its ends. At the left end, as seen in Fig. 4, a sleeve 66 is threaded on rod 65 and is slotted at its end to receive the end of lever 54. A pin 67 is then passed through aligned holes in the slotted end and through slot 55. A sleeve 68 is threaded upon the right end of rod 65. This sleeve is of the same form as 66 and its slotted end receives the end of lever 54'. A pin 69 passes through aligned holes in the slotted ends in the slotted end of sleeve 68 and through slot 55'. The threads upon the ends of rod 65 may be of opposite hand or of the same hand with different pitch so that, by loosening lock nuts 73 and 74 and turning the rod, the distance between the axes of pins 67 and 69 may be made precisely equal to the distance between the pivot axes of the two mirrors 36 and 36'. These mirrors are thus at all times rotated through equal angles.

Pulley 39 has the same effective diameter as the outer diameter of tube 4. As shown upon Figs. 1, 4 and 6, a crossed belt or cable element 70 passes about the central portion of tube 4 and pulley 39. This element may be a section of flexible metallic cable or wire and, to prevent slipping, may be secured to the aforesaid tube and pulley, as by means of screws 71 and 72 (see Figs. 1 and 6). By this connection, any revolution through a given angle of sleeve 7 and the parts supported thereby, (which includes entrance mirrors 36 and 36') about the axis 25 of tube 4, will result in an angular movement of mirrors 36 and 36' about axis 21, equal to twice the aforesaid given angle. This is in accordance with the well-known principle that if a first cylinder is rolled without slipping, about a second cylinder of equal diameter, a radial line connecting the axes of the two cylinders rotates through one-half the angle of rotation of the first cylinder. Thus, since they are fixed in holders 9 and 9', respectively, which holders are, in turn, rigidly attached to sleeve 7, mirrors 22 and 22' are always rotated through one-half the angle of entrance mirrors 36 and 36'; and the rays received by 22 and 22' from 19 and 19', respectively, are always reflected to 24 and 24'. Furthermore, since entrance mirrors 36 and 36' are rigidly united, they rotate as a unit about axis 21 so that no possibility exists of losing stereoscopic vision by slight relative rotation about this axis.

The operation will now be clear. The user first operates thumb screw 37 to effect the proper interpupillary adjustment between eyepieces 34 and 34' and then while looking into the eyepieces, grasps and turns handle 58. Turning handle 58 about the axis of control rod 57 causes the entrance reflectors to pivot synchronously to scan an area in a plane normal to the parallel pivot axes of the mirrors. Also handle 58 may be operated to rotate the brackets 43 and 43'. This movement causes sleeve 7 and all the parts affixed thereto, to rotate as a unit about the axis 25 of tube 4 and enables the scanning of an area in planes normal to axes 21 and 25. Fig. 2 shows the position of the optical parts with the lines of sight directed parallel with the principal optical axes of eyepieces 34, 34'. Fig. 3 shows the position of the same parts when the lines of sight are rotated through 90° and are at right angles to the axes of the eyepieces. It will be noted that mirrors 22 and 22' have rotated through 45°, for a 90° rotation of the lines of sight. Of course, handle 58 may be simultaneously rotated about the axis of its shaft 57, and revolved about axis 25 to direct the lines of sight toward any point within the effective range of adjustment of the instrument. Since this range is limited in azimuth, it may be desirable to mount base 1 for pivotal movement about a vertical axis as by mounting it on a standard leveling head. Then, by rotating base 1 in steps within the effective pivotal range of mirrors 36, 36', scanning may be effected in any direction. It will be understood that the instrument may be operated to direct the lines of sight vertically downwardly from the position shown in Figs. 1 and 2.

I have thus provided a universal scanning sight which is easily operable and highly accurate over its effective range. Since the entrance mirrors are positively connected for movement as a unit about axis 21, there is no possibility of loss of stereoscopic vision and an erect stereoscopic field of view is presented for all positions of adjustment.

While I have disclosed a preferred form of the scanner, as now known to me, various alterations and modifications will readily occur to those skilled in the art, after a study of the present specification and drawing. For example, various mechanical substitutes for the cable connection 70, such as gearing chains or links will suggest themselves. Furthermore, while the instrument has been shown as the binocular type, it may readily be constructed as a monocular instrument by omitting either the right or left train of optical parts. Consequently, the foregoing disclosure should be taken in an illustrative rather than a limiting sense; and it is my desire to reserve all such changes and modifications as fall within the scope of the subjoined claims.

Having now fully disclosed my invention, what I claim and desire to secure by Letters Patent is:

1. In a binocular panoramic telescope, a base, bearing means on said base defining a first, substantially horizontal axis, a sleeve journaled in said bearing means for rotation on said first axis, a pair of holders connected with respective ends of said sleeve and defining a second axis offset from and parallel to said first axis, an objective in each holder, having its principal axis coinciding with said second axis, each holder having a bearing race concentric of said second axis, a frame journaled on said races, a pair of entrance reflectors carried by said frame for pivotal movement about spaced parallel axes normal to said second axis, each axis lying in the plane of its respective reflector, each reflector reflecting a common field of view into its objective, means including a rod longitudinally slidable on said frame connecting said reflectors for synchronous pivotal movement, three erecting reflectors carried by each said holder in positions to reflect said field of view coaxially along said first axis, a pair of eyepieces stationarily mounted on said base with parallel axes normal to said first axis, a pair of double right angle prisms on said base, each reflecting its field of view to a respective eyepiece, and means connecting said frame and base effective to rotate said frame about said second axis through twice the angle of revolution of said frame and holders about said first axis.

2. A telescope as recited in claim 1, said last-named means comprising a hollow shaft journaled on and between said holders on said second axis, pulley means of equal diameter concentric of said first and second axes, respectively, and crossed belt means connecting said pulley means.

3. In a binocular telescopic scanning instrument, a base, a pair of eyepieces, means mounting said eyepieces on said base for translation only toward and from each other for interpupillary adjustment, first bearing means on said base defining a first axis normal to the parallel optical axes of said eyepieces, first and second holders, means rigidly connecting said holders and journaling the same in said bearings for revolution about said first axis, second bearing means on said holders defining a second axis parallel to and offset from said first axis, an objective lens mounted in each holder respectively with its optical axis coincident with said second axis, a rigid unitary frame journaled on said second bearing means, a pair of entrance reflectors pivoted in said frame on respective spaced parallel third axes, each said third axis being in the plane of its reflector and normal to said second axis, a parallelogram linkage connecting said entrance reflectors for pivotal movement in unison in said frame, reflector means in each holder operable to reflect the rays from a respective objective to a corresponding eyepiece, means connecting said base and frame to rotate said entrance reflectors as a unit about said second axis through twice the angle through which said holders revolve about said first axis, and a control handle directly connected with one said entrance reflector along its said third axis.

4. In a binocular panoramic telescope, a fixed base, right and left eyepieces carried by said base, a holder means journaled on said base on a first axis normal to the axes of said eyepieces, right and left objectives carried by said holder means with their common principal axis parallel to and offset from said first axis, a frame journaled on said holder means on said principal axis, right and left entrance reflectors pivoted on said frame on spaced parallel axes normal to and concurrent with said principal axis, the axis of each reflector lying in its reflecting surface, means connecting said reflectors for synchronous pivotal movement, right and left sets of erecting reflectors fixedly mounted on said holder means, each set being effective to reflect the field of view from its objective transversely to and then inwardly along said first axis, prism means carried by said base across said first axis to reflect each field of view into a respective eyepiece, means effective to rotate said frame about said principal axis through twice the angle of revolution of said holder means on said first axis, and manually operable means fixed to one said reflector and operable to universally direct the lines of sight by pivoting said mirrors and rotating said frame, said frame comprising a shaft journaled on said holder means on said principal axis, first pulley means fixed on said shaft, right and left brackets in which said entrance reflectors are respectively pivoted, tube means rigidly connecting said brackets and shaft, second pulley means fixed to said base of equal diameter with said first pulley means, and drive means connecting said first and second pulley means.

5. In a telescope as recited in claim 4, each said entrance reflector having a lever arm radial of its pivot axis, and a rod, adjustable in length, slidable through said tube means and pivoted at its ends to said lever arms.

ROGER HAYWARD.

REFERENCES CITED

The following references are of record in the file of this patent:

UNITED STATES PATENTS

| Number | Name | Date |
| --- | --- | --- |
| 921,137 | Michelson | May 11, 1909 |
| 926,061 | Hahn | June 22, 1909 |
| 1,107,503 | Eppenstein et al. | Aug. 18, 1914 |
| 1,168,650 | Kollmorgen | Jan. 18, 1916 |
| 1,414,790 | Riedinger | May 2, 1922 |
| 1,869,530 | Van Hofe et al. | Aug. 2, 1932 |
| 2,098,917 | Gunther | Nov. 9, 1937 |
| 2,416,697 | Kaiser et al. | Mar. 4, 1947 |